US006321306B1

United States Patent
Arimilli et al.

(10) Patent No.: US 6,321,306 B1
(45) Date of Patent: *Nov. 20, 2001

(54) HIGH PERFORMANCE MULTIPROCESSOR SYSTEM WITH MODIFIED-UNSOLICITED CACHE STATE

(75) Inventors: Ravi Kumar Arimilli; Lakshminarayana Baba Arimilli, both of Austin; John Steven Dodson, Pflugerville; Guy Lynn Guthrie; William John Starke, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,179

(22) Filed: Nov. 9, 1999

(51) Int. Cl.[7] .................................................. G06F 12/12
(52) U.S. Cl. ........................ 711/145; 711/144; 711/146; 711/135; 711/121; 711/141
(58) Field of Search ................................... 711/145, 144, 711/133, 135, 136, 119, 120, 121, 122, 123, 124, 125, 130, 146, 147

(56) References Cited

U.S. PATENT DOCUMENTS

| 5,274,787 | * | 12/1993 | Hirano et al. | 711/143 |
|---|---|---|---|---|
| 5,572,703 | * | 11/1996 | MacWilliams | 711/146 |
| 5,671,391 | * | 9/1997 | Knotts | 711/143 |
| 5,715,428 | * | 2/1998 | Wang et al. | 711/141 |
| 5,797,026 | * | 8/1998 | Rhodehamel et al. | 712/1 |
| 5,832,276 | * | 11/1998 | Feiste et al. | 710/240 |
| 6,018,791 | * | 1/2000 | Arimilli et al. | 711/141 |
| 6,021,468 | * | 2/2000 | Arimilli et al. | 711/122 |
| 6,070,231 | * | 5/2000 | Ottinger | 711/141 |
| 6,141,733 | * | 10/2000 | Arimilli et al. | 711/141 |
| 6,192,451 | * | 2/2001 | Arimilli et al. | 711/141 |

OTHER PUBLICATIONS

Jim Handy, "The Cache Memory Book", Academic Press, Inc., pp. 48–61 and 158–190, 1993.*

* cited by examiner

*Primary Examiner*—Hong Kim
(74) *Attorney, Agent, or Firm*—Casimer K. Salys; Bracewell & Patterson, L.L.P.

(57) ABSTRACT

A novel cache coherency protocol provides a modified-unsolicited ($M_U$) cache state to indicate that a value held in a cache line has been modified (i.e., is not currently consistent with system memory), but was modified by another processing unit, not by the processing unit associated with the cache that currently contains the value in the $M_U$ state, and that the value is held exclusive of any other horizontally adjacent caches. Because the value is exclusively held, it may be modified in that cache without the necessity of issuing a bus transaction to other horizontal caches in the memory hierarchy. The $M_U$ state may be applied as a result of a snoop response to a read request. The read request can include a flag to indicate that the requesting cache is capable of utilizing the $M_U$ state. Alternatively, a flag may be provided with intervention data to indicate that the requesting cache should utilize the modified-unsolicited state.

18 Claims, 4 Drawing Sheets

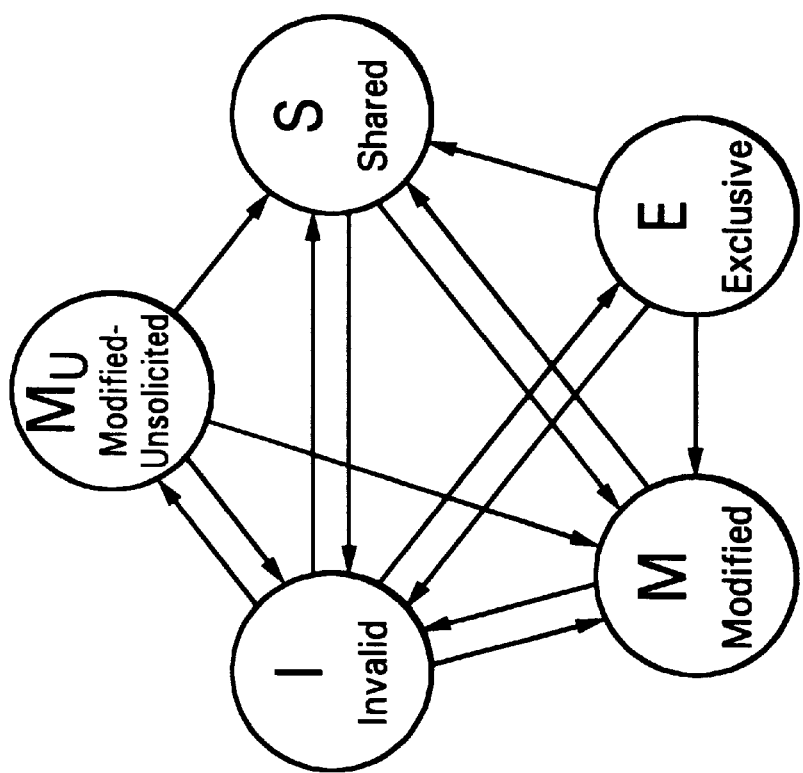
Fig. 3
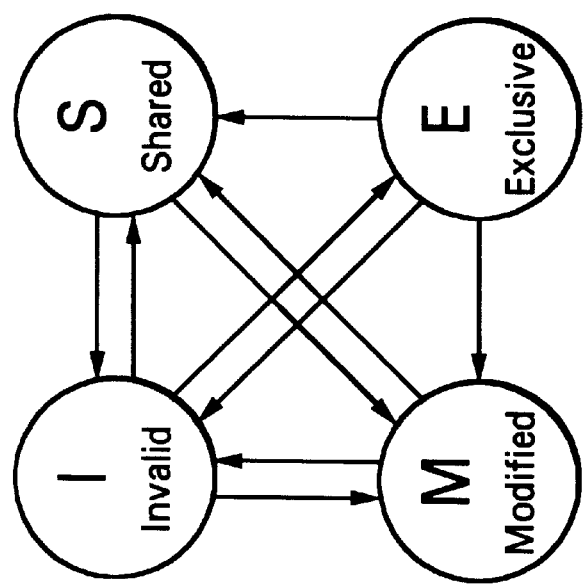
Fig. 2 *Prior Art*

HIGH PERFORMANCE MULTIPROCESSOR SYSTEM WITH MODIFIED-UNSOLICITED CACHE STATE

CROSS-REFERENCES TO RELATED APPLICATIONS

The present invention is related to the following applications filed concurrently with this application: U.S. patent application Ser. No. 09/437,178 entitled "MULTIPROCESSOR SYSTEM BUS PROTOCOL WITH COMMAND AND SNOOP RESPONSES FOR MODIFIED-UNSOLICITED CACHE STATE;" U.S. patent application Ser. No. 09/437,177 entitled "MODIFIED-UNSOLICITED CACHE STATE WITH DYNAMIC HARDWARE/SOFTWARE CONTROLLABLE MECHANISM TO OPTIMIZE FOR LOAD IMBALANCE" U.S. patent application Ser. No. 09/437,176 entitled "LOAD INSTRUCTIONS TO ENHANCE MODIFIED-UNSOLICITED CACHE STATE PROTOCOL" U.S. patent application Ser. No. 09/437,180 entitled "PROTOCOL FOR TRANSFERRING MODIFIED-UNSOLICITED STATE DURING DATA INTERVENTION" U.S. patent application Ser. No. 09/437,181 entitled "CACHE ALLOCATION MECHANISM FOR MODIFIED-UNSOLICITED CACHE STATES".

BACKGROUND OF THE INVENTION

1. Field of the Invention

The present invention generally relates to computer systems, and more particularly to a cache coherency protocol which provides novel mechanisms for handling data in a multi-processor computing system, resulting in improved cache usage and the reduction of bus traffic between horizontal caches when a value contained in one cache is modified after being retrieved, in a previously modified form, from a cache of an adjacent processing unit.

2. Description of Related Art

The basic structure of a conventional multi-processor computer system 10 is shown in FIG. 1. Computer system 10 has several processing units, two of which 12a and 12b are depicted, which are connected to various peripheral devices, including input/output (I/O) devices 14 (such as a display monitor, keyboard, graphical pointer (mouse), and a permanent storage device or hard disk), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such as serial, parallel, and universal system bus (USB) ports for connection to, e.g., modems, printers or scanners. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corp. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the additional latency of loading the values from memory 16. These caches are referred to as "on-board" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In a multi-level cache, if a copy of a value is in every level of the cache, the cache hierarchy is referred to as being "inclusive." It is not necessary, however, to keep a copy of each value in the lower levels, and an inclusivity bit field may be added to the caches to indicate whether or not the cache is inclusive. For example, a three-level cache structure might provide an L3 cache which was not inclusive, such that a value residing in the L2 cache might not be present in the L3 cache. In this example, if an L2 cache issues a read command for a value that is not present in any of the caches of that processing unit, it can be passed to that L2 cache without (necessarily) loading it into the L3 cache.

In an SMP computer, it is important to provide a coherent memory system, that is, to cause write operations to each individual memory location to be serialized in some order for all processors. By way of example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Nearly all coherency protocols operate only to the granularity of the size of a cache block. That is to say, the coherency protocol controls the movement of and write permissions for operand data or instructions on a cache block basis, and not separately for each individual memory location.

There are a number of protocols and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect (i.e., bus 20). The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block requested by processing unit in its L1 cache, and the value in that block is modified, and any lower level caches also have copies of the block, then their copies are stale, since the copy in the processor's cache is modified. Therefore, when the lowest level cache (e.g., L3) of the processing unit snoops the read operation, it will determine that the block requested is present and modified in a higher level cache. When this occurs with an in-line cache structure, the L3 cache places a message on the generalized interconnect informing the processing unit that it must "retry" it's operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

Thus, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read it receives a message indicating whether or not the read must be retried (i.e., reissued later). If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache coherency technique is implemented in a specific protocol referred to as "MESI," and illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a sector is in the Modified state, the addressed sector is valid only in the cache having the modified sector, and the modified value has not been written back to system memory. When a sector is Exclusive, it is present only in the noted sector, and is consistent with system memory. If a sector is Shared, it is valid in that cache and in at least one other cache, all of the shared sectors being consistent with system memory. Finally, when a sector is Invalid, it indicates that the addressed sector is not resident in the cache. As seen in FIG. 2, if a sector is in any of the Modified, Shared or Invalid states, it can move between the states depending upon the particular bus transaction. While a sector in an Exclusive state can move to any other state, a sector can only become Exclusive if it is first Invalid.

A further improvement in accessing cache blocks can be achieved using the cache coherency protocol. This improvement, referred to as "intervention," allows a cache having control over a memory block to provide the data in that block directly to another cache requesting the value (for a read-type operation), in other words, bypassing the need to write the data to system memory and then have the requesting processor read it back again from memory. Intervention can generally be performed only by a cache having the value in a block whose state is Modified or Exclusive. In both of these states, there is only one cache block that has a valid copy of the value, so it is a simple matter to source (write) the value over the bus 20 without the necessity of first writing it to system memory. The intervention procedure thus speeds up processing by avoiding the longer process of writing to and reading from system memory (which actually involves three bus operations and two memory operations). This procedure not only results in better latency, but also increased bus bandwidth.

There are many variations of the MESI protocol. The tagged ("T") state is used to identify a cache block which is inconsistent with system memory (i.e., modified) and is further responsible for writing the correct (current) value to memory upon deallocation (or to pass on the tag to another cache block during intervention). The T state can be used to share a modified value, by marking one of the sharing blocks as (temporarily) responsible for maintaining a valid copy of the value. The recently read ("R") state can be used to allow intervention when the value is unmodified but shared among many caches, so as to conveniently mark a single one of the sharing caches as being responsible for intervention. The hover ("H") state allows a cache line to maintain an address in the directory even though the corresponding value in the cache entry array is an invalid copy, so that it can snoop the correct value for its processing unit if the value happens to be broadcast as part of an intervention between the caches of two other processing units.

In many instances, a value that is modified by a store operation, and thus present in a cache of the particular processing unit that issued the store operation, will subsequently be modified by another processing unit before the cache evicts the modified value. When one cache issues a read request and another cache contains a modified value corresponding to the requested address, the other cache typically will intervene the value, copy the line back to system memory, and switch its cache line from the modified (M) cache coherency state to the shared (S) state. If, however, the requesting cache quickly follows up the read request with a write operation to the same address, then the other (intervening) cache must deallocate the corresponding cache line, i.e., switch its state from shared to invalid (I). This follow-up write operation accordingly requires a bus transaction (e.g., a DClaim instruction) to inform the other cache that it must deallocate the line. This bus transaction to invalidate a cache line may take as long as 100 processor cycles to complete, which can ultimately delay processing. It would, therefore, be desirable to devise a method of maintaining cache coherency which allowed a requesting cache to modify a value provided via intervention in response to a read request, without having to issue a bus transaction, in order to decrease bus traffic and speed up processing. It would be further advantageous if the method could be selectively implemented for those applications which tended to perform such modifications quickly after reading the value from another cache.

SUMMARY OF THE INVENTION

It is therefore one object of the present invention to provide an improved method of maintaining cache coherency in a multi-processor computer system.

It is another object of the present invention to provide such a method that allows a cache to avoid unnecessary bus transactions issued to other horizontal caches.

It is yet another object of the present invention to provide a computer system which makes more efficient use of a cache having a cache line replacement/victimization algorithm.

The foregoing objects are achieved in a method of maintaining cache coherency, comprising the steps of storing a modified value corresponding to a memory block of a system memory device into a first cache line of a first processing unit, assigning a first coherency state (the conventional M state) to the first cache line indicating that the first cache line contains the modified value, sourcing the modified value from the first cache line to a second cache line of a second processing unit, deallocating the first cache line, and assigning a second coherency state (the modified-unsolicited, or $M_U$ state) to the second cache line indicating that the second cache line contains the value as modified by another processing unit and that the modified value has not been written to the memory block of the system memory device. When a store operation is thereafter issued from the second processing unit, the value may be modified in the second cache line without issuing any bus transaction. A cache line in the $M_U$ state may transition to several other state, including the conventional M, S and T states. Deallocation of the first cache line may be performed in response to receipt of a read request having a flag indicating that the second cache is capable of utilizing the second coherency state. Alternatively, the first cache may issue a flag to the second cache indicating that the second cache should assign the $M_U$ state to the second cache line.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2 is a state diagram depicting a prior art cache coherency protocol (MESI);

FIG. 3 is a state diagram depicting the cache coherency protocol of the present invention, providing a novel coherency state ($M_U$) to allow a cache to modify a value, in response to a store operation, without issuing a bus transaction to another cache which previously intervened the requested value;

DESCRIPTION OF AN ILLUSTRATIVE EMBODIMENT

Figure 1:
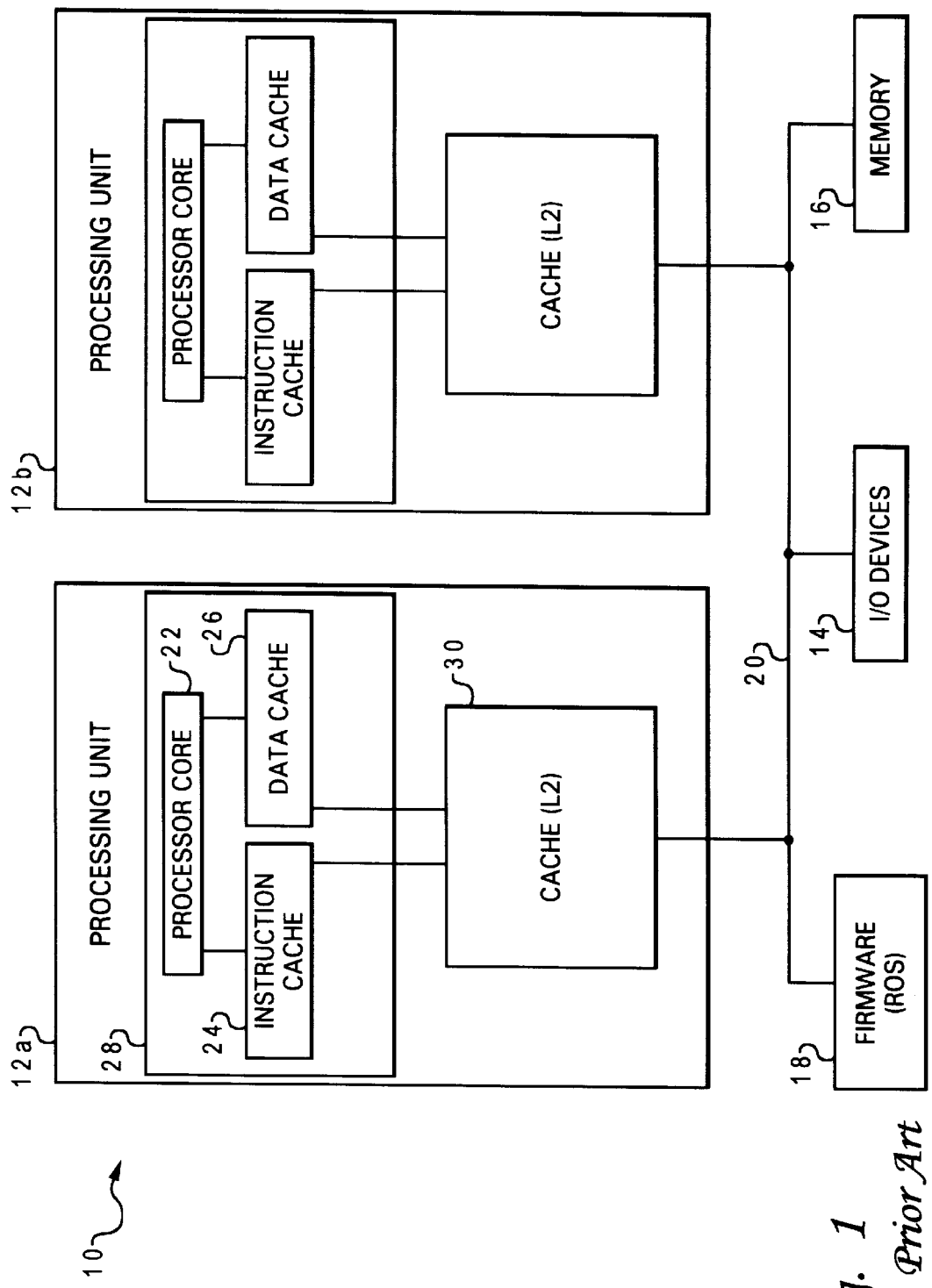
FIG. 1 is a block diagram of a prior-art multi-processor computer system.

With reference now to FIG. 3, there is depicted a state diagram of one embodiment of the cache coherency protocol of the present invention. This protocol is similar to the prior art MESI protocol of FIG. 2, in that it includes the same four prior states (Modified, Exclusive, Shared and Invalid), but it also includes a new "$M_U$" state (Modified-Unsolicited). The $M_U$ state indicates that: (1) the subject value has been modified (i.e., is not currently consistent with system memory); (2) the value was modified by another processing unit (i.e., not by the processing unit associated with the cache that currently contains the value in the $M_U$ state); and (3) the value is exclusively held (i.e., it is not present in any other horizontally adjacent caches). Because the value is exclusively held, it may be modified in that cache without the necessity of issuing a bus transaction to other horizontal caches in the memory hierarchy.

If a processor core executes a load operation and its cache does not currently contain a valid copy of the requested value, the cache passes the load operation to the remainder of the memory hierarchy to obtain the value. If the value is not present in any cache of the computer system, it is provided by system memory. According to one implementation of the present invention, however, if the value is currently contained in a cache associated with another processing unit, and has already been modified by that processing unit (i.e., is currently in the M state), then the value is retrieved from that cache (via intervention), loaded into a cache of the requesting processor, and assigned the $M_U$ state. The intervening cache immediately deallocates the corresponding cache line. Thus, when the same processor core issues a subsequent store instruction to the same address, the $M_U$ state provides an indication to its cache that the value is not currently contained in any other horizontally adjacent caches within the memory hierarchy. Accordingly, the cache is free to store the modified value, and switch the state of its cache line from $M_U$ to M without issuing any bus transactions, as there is no need to deallocate any cache line(s) in the other cache(s).

In contrast, in the prior art, it would be necessary to issue a deallocation request (e.g., DClaim operation) to the intervening cache which would still contain the value. If the standard MESI protocol were in use, upon intervention from the responding cache, both caches would contain the value in the shared (S) state—the value would also be copied back to system memory during intervention. If the alternative T-MESI protocol were implemented, the value would not be written back to system memory, but the responding cache would still hold the value in the S state, and the requesting cache would assign the T state to the cache line. In either case, when the processor core of the requesting cache issued the follow-up write instruction, it would be necessary to deallocate the line held in the S state in the other cache. This deallocation operation would increase bus traffic and delay processing.

In a preferred implementation of the present invention, a flag (single-bit field) is sent with the read request to indicate that the requesting cache is capable of utilizing the $M_U$ state (i.e., owning previously modified data). Accordingly, the snoop response from the intervening cache can specifically instruct the requesting cache to utilize that state, in which case the intervening cache will switch from the modified state to the invalid state. This approach allows the use of the modified-unsolicited state to be optional, as the intervening cache might alternatively send a conventional snoop response, e.g., instructing the requesting cache to assign the shared or tagged state to the cache block. Alternatively, the master (intervening cache) could send a snoop response instructing the requesting cache to simply assign the conventional modified state to the block.

Use of this flag may be programmable via either software or hardware. Software that is visible to the computer's operating system may make a determination that it is desirable to use the $M_U$ state (based on the particular program application running), and instruct the operating system to enter an operating mode in which the flag is appropriately set. Hardware may alternatively be provided to dynamically monitor cache usage; for example, the modified-unsolicited state might be disabled if the monitor determines that many castouts and/or modified intervention requests have occurred on $M_U$ cache lines. Each processing unit could have its own monitor, or a system-wide monitor could be provided (e.g., as part of the memory controller). If the flag sent with the request indicates that the $M_U$ state is to be excluded, then conventional intervention occurs.

The programmability feature could further be made visible to a user by adding a hint bit to the load instruction, as part of the instruction set architecture. The instruction set architecture (ISA) for the processor core (e.g., the ISA of a PowerPC™ 630 processor) could be extended to allow software, via the compiler program, to directly indicate the desirability of using the $M_U$ state for a particular set of load instructions using the hint bit. The availability of the feature as part of the ISA is particularly advantageous since it can be dynamically implemented with each individual instruction.

In an alternative implementation of the present invention, a flag can be sent with the intervention data to indicate that the $M_U$ state may be used. In other words, the requesting cache passes the read operation to the remainder of the memory hierarchy in a conventional fashion, but the intervening cache sends the requested value with a flag indicating that the requesting cache can (should) assign the $M_U$ state to the cache line. This flag thus indicates that the requested value has been supplied via intervention rather than from system memory, and that the line in the intervening cache has already been deallocated. This variation differs from the above-explained implementation since it is not the snoop response that instructs the requesting cache to use the $M_U$ state, but rather the indicating flag is supplied along with the requested data.

In another refinement of the present invention, the eviction/victimization algorithm used by the cache may be modified to further enhance cache efficiency. If a cache miss occurs, and if all of the blocks in a particular congruence class already have valid copies of memory blocks, then one of the cache blocks must be selected for victimization. This selection, in the prior art, is typically performed using an array of bits that indicate which of the blocks is the least-recently used (LRU). For example, there are three LRU bits per block for an 8-way set associative cache. The LRU bits from each block in the class are provided as inputs to a decoder having an 8-bit output to indicate which of the blocks is to be victimized. Several LRU hardware solutions have been implemented to provide "fair" information replacement. Fair replacement, however, often does not provide the best application performance. For some applications, it may be preferable to evict a cache line that is in the $M_U$ state, while for others it may be preferable to never victimize $M_U$ data, if possible. Accordingly, the LRU bits may be set for $M_U$ data depending upon the particular application. For example, when a value is loaded into a prior art cache, its LRU bits would be set to indicate that it is the most-recently used (MRU) block, but the present invention can override this setting for $M_U$ data, to instead set the bits to indicate that the block is the least-recently used. Conversely, an LRU decoder can be designed such that $M_U$ data is never evicted (unless all blocks in the congruence class are in the $M_U$ state).

Figure 4:
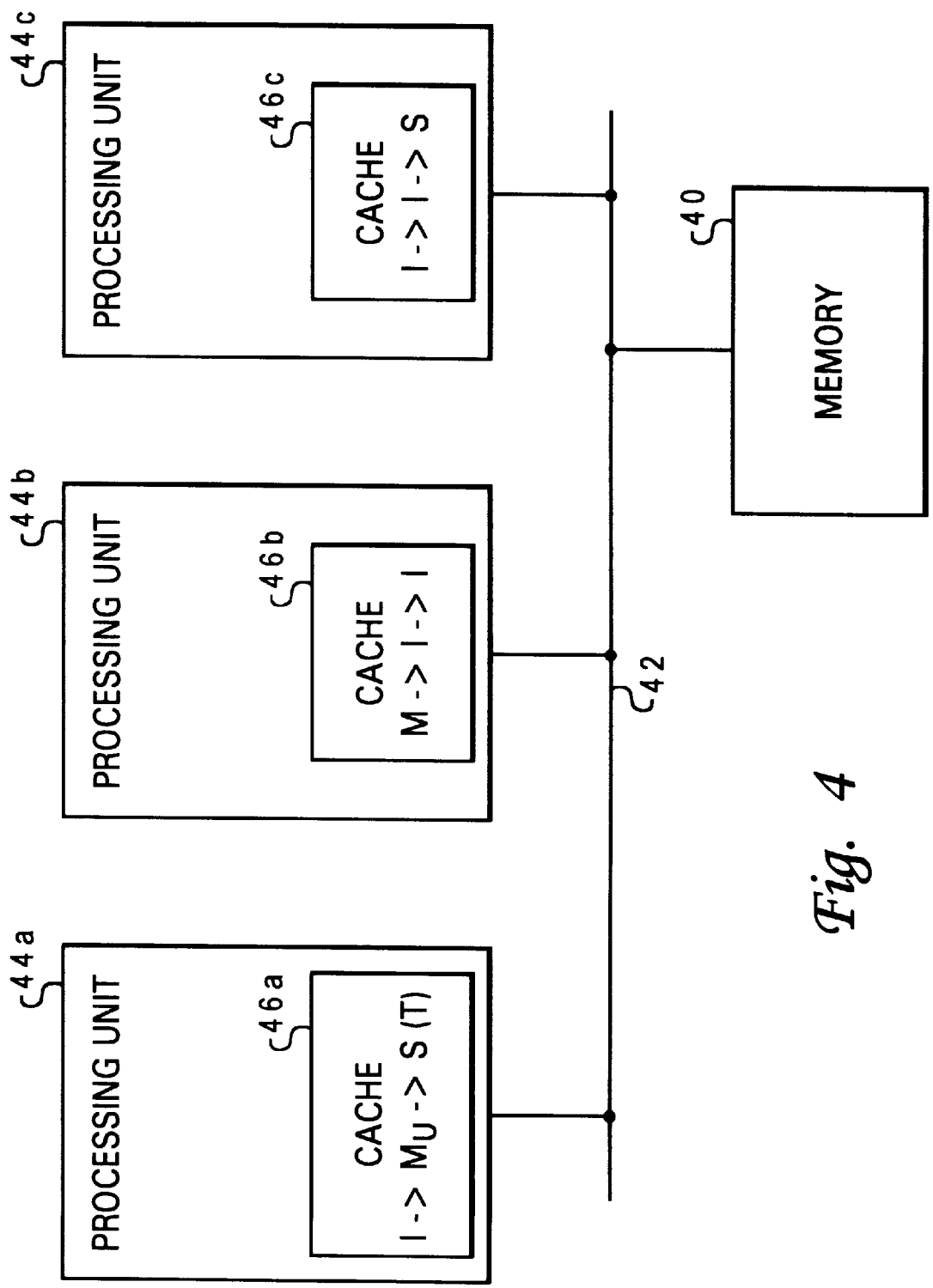
FIG. 4 is a block diagram illustrating one embodiment of the invention within a multi-processor computing system having at least three processing units with associated caches.

FIG. 4 illustrates one embodiment of a multi-processor computer system in which the present invention can be practiced. The invention could be applied to computer systems having new hardware components not shown in FIG. 4, or having other interconnection architectures, so those skilled in the art will appreciate that the present invention is not limited to the generalized system shown in that figure. In this embodiment, the hierarchy includes a system memory device 40 connected via a system bus 42 to a plurality of processing units, 44a, 44b and 44c. Each of these processing units has at least one cache 46a, 46b and 46c (the invention could be applied in multi-level cache hierarchies as well). As seen in FIG. 4, when a cache line is read from cache 46b which already has the line in the modified (M) state, the line goes from invalid (I) to modified-unsolicited ($M_U$) in the requesting cache 46a, and the corresponding line in intervening cache 46b is immediately deallocated (goes from M to I). Thereafter, if a store operation were to hit cache 46a, the line would go from modified-unsolicited to modified (M) (not illustrated in FIG. 4), without any bus transactions between cache 46a and cache 46b. If, however, no store operation occurs prior to a load request from cache 46c then, as illustrated in FIG. 4, cache 46a can intervene the value and switch its state to shared (S), with the value being written to system memory 40 as well. The line in cache 46c is also assigned the shared state. As indicated by the parentheses in FIG. 4, the line in cache 46a could switch to the tagged (T) state if the value is not to be immediately written back to system memory 40.

Figure 5:
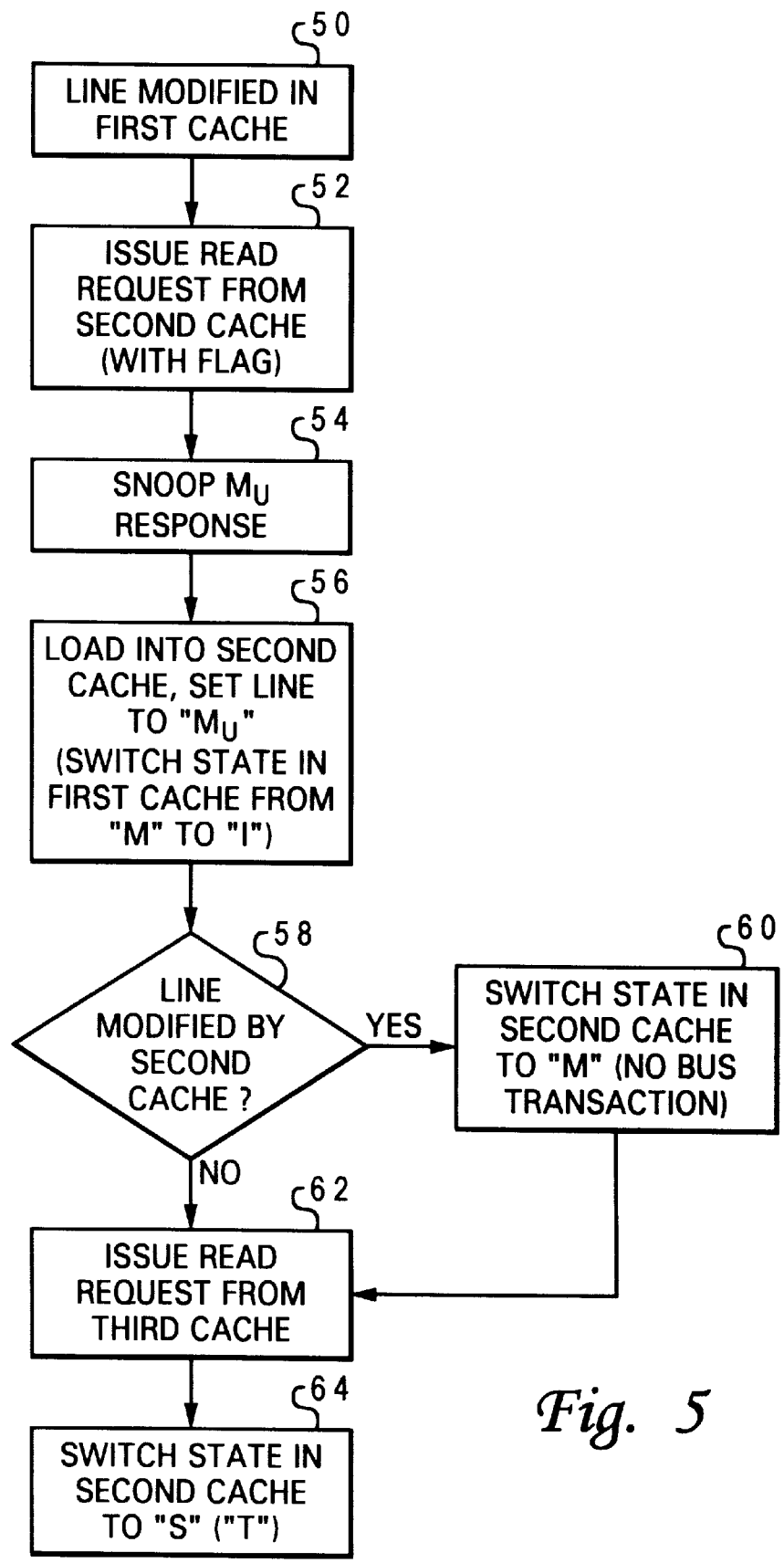
FIG. 5 is a chart illustrating the logic flow according to one implementation of the present invention.

The logic flow for this implementation is shown in FIG. 5. First, a line is modified in one of the caches (50). A read request is then issued from a second cache, which may be issued with the flag discussed above (52). A snoop response is formulated to indicate that the line can be loaded in the $M_U$ state in the second cache (54). The cache line is then loaded into the second cache, and set to the $M_U$ state (56); the line in the first cache switches from the M state to the I state. Thereafter, if the line is modified (58), then the second cache can switch to the M state with no bus transaction (60). Whether the line is modified or not, if a read request is issued from a third cache (62), the line in the second cache switches to the S (or T) state (64) when it intervenes the data to the third cache.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of maintaining cache coherency in a computer system having a plurality of processing units, each processing unit having at least one cache, comprising the steps of:

storing a modified value corresponding to a memory block of a system memory device into a first cache line of a first processing unit;

assigning a first coherency state to the first cache line indicating that the first cache line contains the modified value;

sourcing the modified value from the first cache line to a second cache line of a second processing unit;

deallocating the first cache line; and assigning a second coherency state to the second cache line indicating that the second cache line contains the value as modified by another processing unit and that the modified value has not been written to the memory block of the system memory device.

2. The method of claim 1 further comprising the steps of:

issuing a store operation for an address associated with the memory block from the second processing unit, after said sourcing step; and modifying the value in the second cache line in response to the store operation, wherein said modifying step occurs without issuing any bus transaction from a cache containing the second cache line further in response to a determination that the second cache line contained the value exclusive of caches of other processing units of the computer system.

3. The method of claim 2 further comprising the step of assigning the first coherency state to the second cache line in response to said modifying step.

4. The method of claim 3 further comprising the steps of:

issuing a load operation for the address associated with the memory block from a third processing unit, after said modifying step;

sourcing the modified value from the second cache line to a third cache line of the third processing unit in response to the load operation;

writing the modified value to the memory block of the system memory device; and assigning a third coherency state to the second and third cache lines indicating that the second and third cache lines contain shared copies of the value that are consistent with the system memory device.

5. The method of claim 3 further comprising the steps of:

issuing a load operation for the address associated with the memory block from a third processing unit, after said modifying step;

sourcing the modified value from the second cache line to a third cache line of the third processing unit in response to the load operation, without writing the modified value to the memory block of the system memory device; and assigning a third coherency state to only a selected one of the second and third cache lines indicating that the selected cache line contains the modified value and that the modified value has not been written to the memory block of the system memory device.

6. The method of claim 1 further comprising the steps of:

issuing a load operation for the address associated with the memory block from a third processing unit, after said step of sourcing the modified value from the first cache line to a second cache line;

sourcing the modified value from the second cache line to a third cache line of the third processing unit in response to the load operation;

writing the modified value to the memory block of the system memory device; and assigning a third coherency state to the second and third cache lines indicating that the second and third cache lines contain shared copies of the value that are consistent with the system memory device.

7. The method of claim 1 further comprising the steps of:

issuing a load operation for the address associated with the memory block from a third processing unit, after said step of sourcing the modified value from the first cache line to a second cache line;

sourcing the modified value from the second cache line to a third cache line of the third processing unit in response to the load operation, without writing the modified value to the memory block of the system memory device; and assigning a third coherency state to only a selected one of the second and third cache lines indicating that the selected cache line contains the modified value and that the modified value has not been written to the memory block of the system memory device.

8. The method of claim 1 wherein said deallocating step is performed in response to the further step of a first cache containing the first cache line receiving a read request from a second cache containing the second cache line, wherein the read request includes a flag indicating that the second cache is capable of utilizing the second coherency state.

9. The method of claim 1 wherein the step of assigning the second coherency state is performed in response to the further step of a first cache containing the first cache line issuing a flag to a second cache containing the second cache line wherein the flag indicates that the second cache should assign the second coherency state to the second cache line.

10. A computer system comprising:

a system memory device;

a plurality of processing units each having a cache;

bus means for interconnecting said processing units and said system memory device; and cache coherency means for (i) assigning a first coherency state to a first cache line of a first cache indicating that said first cache line contains a modified value, (ii) sourcing the modified value from said first cache line to a second cache line of a second cache, (iii) deallocating said first cache line, and (iv) assigning a second coherency state to said second cache line indicating that said second cache line contains the value as modified by another processing unit and that the modified value has not been written to said system memory device.

11. The computer system of claim 10 wherein said cache coherency means further modifies the value in said second cache line in response to a store operation for an address associated with the value issued by a processing unit associated with said second cache, without issuing any bus transaction from said second cache further in response to a determination that said second cache line contained the value exclusive of caches of other processing units of the computer system.

12. The computer system of claim 11 wherein said cache coherency means further assigns the first coherency state to said second cache line in response to modifying the value in said second cache line.

13. The computer system of claim 12 wherein said cache coherency means further sources the modified value from said second cache line to a third cache line of a third cache and writes the modified value to said system memory device in response to a load operation issued from a third processing unit, and assigns a third coherency state to said second and third cache lines indicating that said second and third cache lines contain shared copies of the value that are consistent with said system memory device.

14. The computer system of claim 12 wherein said cache coherency means further sources the modified value from said second cache line to a third cache line of a third cache in response to a load operation issued from a third processing unit, without writing the modified value to said system memory device, and assigns a third coherency state to only a selected one of said second and third cache lines indicating that said selected cache line contains the modified value and that the modified value has not been written to said system memory device.

15. The computer system of claim 10 wherein said cache coherency means further sources the modified value from said second cache line to a third cache line of a third cache and writes the modified value to said system memory device in response to a load operation issued from a third processing unit, and assigns a third coherency state to said second and third cache lines indicating that said second and third cache lines contain shared copies of the value that are consistent with said system memory device.

16. The computer system of claim 10 wherein said cache coherency means further sources the modified value from said second cache line to a third cache line of a third cache in response to a load operation issued from a third processing unit, without writing the modified value to said system memory device, and assigns a third coherency state to only a selected one of said second and third cache lines indicating that said selected cache line contains the modified value and that the modified value has not been written to said system memory device.

17. The computer system of claim 10 wherein said cache coherency means deallocates said first cache line in response to said first cache receiving a read request from said second cache, wherein the read request includes a flag indicating that said second cache is capable of utilizing the second coherency state.

18. The computer system of claim 10 wherein said cache coherency means assigns the second coherency state in response to said first cache issuing a flag to said second cache wherein the flag indicates that said second cache should assign the second coherency state to said second cache line.

* * * * *